United States Patent [19]

Niwa et al.

[11] Patent Number: 5,302,032
[45] Date of Patent: Apr. 12, 1994

[54] RADIAL/THRUST COMPOSITE-BEARING HAVING ROLLING ELEMENTS

[75] Inventors: Kosaburo Niwa; Hideyumi Matsumura, both of Nagoya, Japan

[73] Assignee: Daido Metal Company Ltd., Nagoya, Japan

[21] Appl. No.: 83,169

[22] Filed: Jun. 29, 1993

[30] Foreign Application Priority Data

Jul. 1, 1992 [JP] Japan .................................. 4-174457

[51] Int. Cl.⁵ .............................................. F16C 19/54
[52] U.S. Cl. .................................................... 384/454
[58] Field of Search ........ 384/126, 127, 548, 551–555, 384/569, 572, 576, 282, 454

[56] References Cited

U.S. PATENT DOCUMENTS

| | | | |
|---|---|---|---|
| 1,286,615 | 12/1918 | Hatashita | 384/548 |
| 2,222,491 | 11/1940 | Scribner | 384/282 |
| 2,986,430 | 5/1961 | Banerian | 384/127 |
| 3,161,449 | 12/1964 | Flom | 384/282 |
| 3,920,292 | 11/1975 | Haussels | 384/454 |
| 4,109,977 | 8/1978 | Staphan | 384/454 |
| 4,886,377 | 12/1989 | Adachi et al. | 384/548 X |

*Primary Examiner*—Thomas R. Hannon
*Attorney, Agent, or Firm*—Browdy and Neimark

[57] ABSTRACT

A bearing comprises a metallic outer tube having a flange, a inner tube of resin having a flange, radial rollers, thrust balls and a collar. A plurality of roller receiving grooves are formed on the outer periphery of the inner tube, while a plurality of roller receiving recesses are formed on the flange of the inner tube. The receiving grooves are formed in parallel relation to the bearing axis. The receiving recesses are formed circumferentially in concentric relation to the bearing axis. Each of the rollers received respectively within the receiving groove is rotatable. Grease is possibly apply to an outer peripheral surface of the inner tube body and a flange surface thereof. The cylindrical outer tube covering the entirety has both ends which are bent toward the axis. As corrosion countermeasure, it is preferred to form metallic parts of the bearing with stainless steel.

2 Claims, 5 Drawing Sheets

RADIAL/THRUST COMPOSITE-BEARING HAVING ROLLING ELEMENTS

BACKGROUND OF THE INVENTION

The present invention relates chiefly to a small bearing and, particularly, to a radial/thrust composite-bearing jointly having both functions of a slide bearing and a roller bearing.

Generally, a radial/thrust composite bearing of a roller bearing comprises, as a mechanism for receiving a radial load, an inner race (inner tube) and an outer race (outer tube), in which balls perform rolling motion between thrust plates. As a typical example thereof, there are shown in the attached drawings of FIGS. 8 and 9 a ball bearing type and a needle roller type, respectively.

On the other hand, in a slide bearing, a bearing surface receiving a thrust load and a bearing surface receiving a radial load perform relative sliding motion between these bearing surfaces and a shaft. FIG. 10 shows, as an example, a radial/thrust composite-type slide bearing having a bush configuration.

Conventionally, in a radial/thrust composite bearing of a roller bearing, there are many cases where a thrust plate 01 and a retainer 02 for retaining balls or rollers are arranged as separate parts, and are not integrated with a bearing body. For this reason, there are many inconveniences on assembling the bearing to a housing and on custody. Further, in case where the bearing is brought to a bearing of integrated type, the number of parts increases and, as a result, the bearing is brought to an expensive one.

Generally, the roller bearing is characterized in that the balls perform rolling motion between the inner ring and the outer ring. Also in the needle roller bearing, needle rollers perform rolling motion between the inner and outer rings or between the outer ring and the shaft.

Similarly, the radial/thrust composite rolling bearing is brought to a mechanism which receives a load by rolling contact while the balls or the needle rollers perform rotational movement and revolution. Furthermore, in case of the thrust load, transferring of the load is performed by rolling contact between the balls or the rollers. For this reason, for the outer tube, the inner tube, the thrust plate, the rollers and the needle roller, processing of quenching and polishing is required after machinery processing of the parts has been performed. Many steps and skillful technique are required and this increases the cost. Moreover, since heavy-load type and light-load type are the same in structure as each other, it is difficult to design a bearing thickness ($t_1$) and a flange thickness ($t_2$) thin like the slide bearing. For this reason, the radial/thrust bearing has a disadvantage that a bearing weight is excessive.

On the other hand, in the radial/thrust composite bearing of slide bearing type, it is required for the shaft to have a surface receiving the thrust load, and a high finishing precision and high hardness are required for the thrust surface of the shaft because the shaft and the bearing surface relatively slide with respect to each other. For this reason, there is a disadvantage that the cost for manufacturing the shaft increases.

Further, in a slide bearing having a small diameter, a radial/thrust composite bearing is light in weight and small in size as compared with a needle roller-type bearing. However, when the radial/thrust composite bearing is used under middle and high rotation (at not slower than 30 to 100 m/min of peripheral speed of bearing), oil supply is required, and there are problems in secureness of oil, oil discharge and the like. Furthermore, at locations where the bearing is used under no-lubrication, friction increases as compared with the rolling bearing. Thus, the radial/thrust composite bearing has such a disadvantage that a driving force for instruments increases.

SUMMARY OF THE INVENTION

The invention has been done under such technical background, and an object of the invention resides in providing a radial/thrust composite bearing which has both functions of a roller bearing and a slide bearing and which is light in weight and small in size.

Under the above-mentioned object, there is provided a radial/thrust composite bearing having rolling elements, which comprises a metallic outer tube having a flange at one end thereof, an inner tube of resin having a flange at one end thereof, a plurality of radial rollers of the rolling elements interposed between both the tubes, and a plurality of thrust balls of the rolling elements interposed between both the flanges of the respective inner and outer tubes, wherein a plurality of radial-roller receiving grooves which extend in a direction along an axis of the bearing and which are parallel with one another are formed on an outer peripheral surface of the inner tube, and a plurality of thrust ball receiving recesses are formed intermittently and circumferentially on a surface of the flange of the inner tube, which faces to the position side of the radial-roller receiving grooves on the outer surface of the inner tube;

a circumferential raceway groove for inducing or suiding the thrust ball are formed on a surface of the flange of the outer tube, which opposes to the flange of the inner tube; and wherein the two kinds of rolling elements roll between both the inner and outer tubes.

The radial rollers stated above are preferably made from a steel wire or rod having good wear resistance property.

Conventionally, in roller and ball bearings, a retainer element for needle rollers or balls is exclusively used to fix positions of the needler rollers or the balls. The present inventors paid their attention to the retainer and employed an inner tube structure which serves as the retainer as well as the inner tube, in which rolling elements of roller are respectively received in the roller receiving grooves which are provided to the plastic inner tube having a flange, in which the thrust rolling elements of ball are intermittently arranged along a circumferential direction respectively in the thrust ball retaining recesses which are provided to a flange section, and in which the thrust balls receive a thrust load and rotate, whereby the thrust load is transmitted from the inner tube to the outer tube via the balls.

According to the bearing of the present invention, a shaft to be born is not in direct contact with the rolling elements. Accordingly, a usual quenched inner race is not required and a quenching treatment may be omitted with regard to a shaft which is supported by the bearing. Further, recent appearance of high strength synthetic resins (or plastics) makes it possible to design the thickness of the inner tube to a thin one to obtain size or dimension approximate to the thickness of the slide bearing.

It is effective as corrosion countermeasure for a bearing to form the outer tube of the invention with austenitic stainless steel. Moreover, it is possible to form the inner tube of resin by anyone of polyether ether ketone (PEEK), polyether sulphone (PES), polyether nitrile (PEN), polyphenylen sulfide (PPS), polyacetal (POM), polyether imide (PEI) and polyamide imide (PAI), and it is also possible to use material in which a bulking agent or filler such as a solid lubricating agent, fluororesin or fluorocarbon resin, fiber material, metallic oxide, metallic fluoride, ceramics or the like is added to the aforesaid main components or primary components. The use of fiber reinforced resin is preferable. The radial rollers may be produced from an austenitic stainless wire, a bearing steel wire, a piano wire or the like, and it is possible to produce the thrust balls from a metal, stainless steel, ceramics or the like.

In the invention, a given amount of grease is preferably applied to the outer peripheral surface of the inner tube of resin and the flange surface which retain the rollers for improving wear resistance, and the outside thereof is covered with the outer tube, whereby it is possible to bring friction coefficient to 0.01 to 0.07.

According to the structure of the present invention, since the inner tube and the radial rollers and the thrust balls are retained in the metallic (preferably steel) outer tube, the arrangement can be handled as a single assembly. Thus, the arrangement may be formed in a more compact size.

In the invention bearing, a particular consideration is taken into prohibiting deformation of the flange section of the inner tube of resin to which thrust and radial loads act on the inner tube in order to keep a stable operation of the bearing. When a thrust load acts on the inner tube which rotates together with the shaft, the resin flange is compressed in its thickness direction as to extend radially. If the resin flange is brought into contact with the circumferential end portion of the flange section of the outer tube by the above deformation, a malfunction will occur with respect to the bearing operation. In order to prohibit such deformation, according to the invention, the circumferential groove is provided with the flange section of the metallic outer tube, in which the thrust balls are received and guided to move. When a radial deformation force acts on the resin flange as described above, an extension of the resin flange is prohibited under an engagement relationship between the thrust ball receiving recesses, the thrust balls and the circumferential groove of the metallic flange. The circumferential groove also improves rigidity of the metallic flange.

Further, the arrangement is such that grease grooves are provided with to the flange section of the inner tube of resin which opposes to the outer tube flange, and the thrust balls of steel or ceramics, having excellent friction resistance, are intermittently and evenly arranged along the circumferential direction. Thus, it is possible to prohibit deformation of the both flange sections of resin and metal to minimum.

DESCRIPTION OF THE PREFERRED EMBODIMENTS

The invention will hereunder be described in detail.

Figure 1:
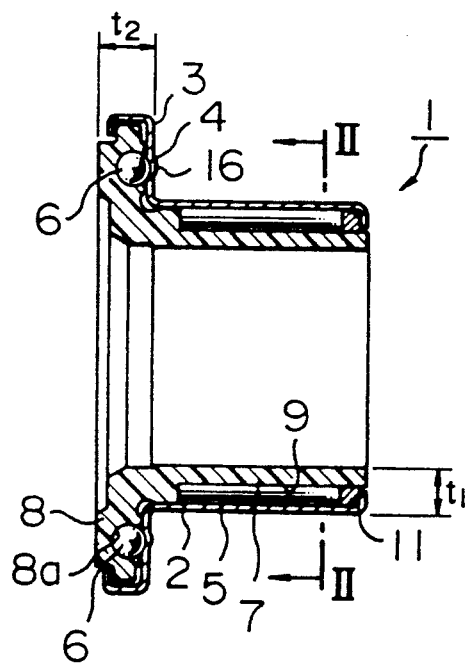
FIG. 1 is a longitudinal cross-sectional view showing a bearing according to the invention.
Figure 2:
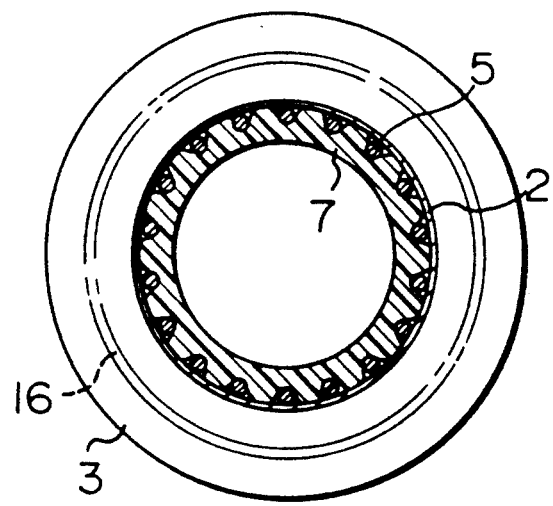
FIG. 2 is a cross-sectional view taken along line II—II in FIG. 1.
Figure 3:
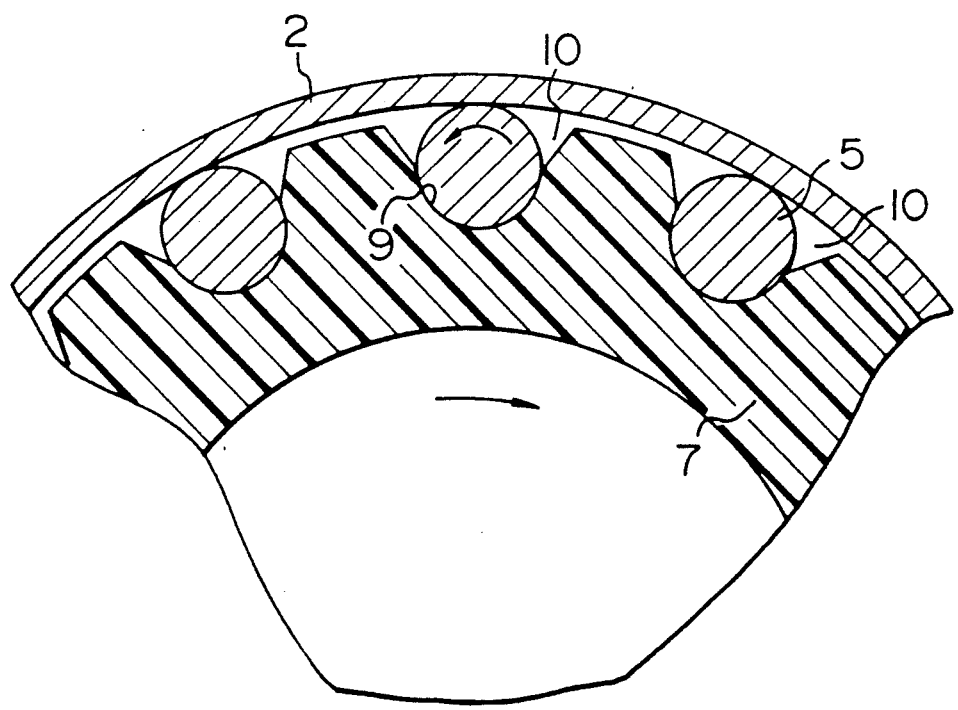
FIG. 3 is an enlarged view showing an essential portion in FIG. 2.
Figure 4:
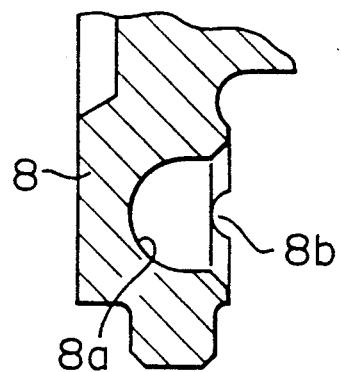
FIG. 4 is a cross-sectional view showing an essential portion of a flange section in an inner tube of resin.
Figure 5:
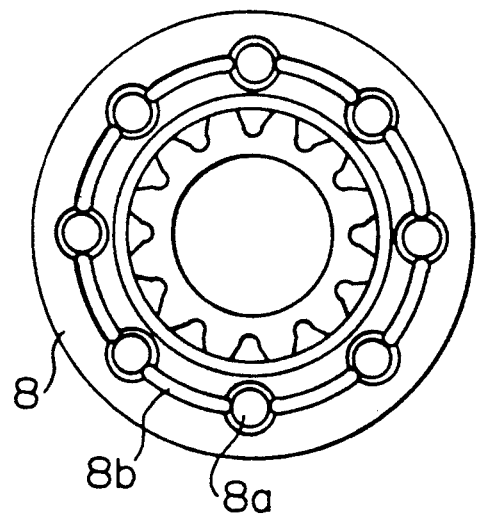
FIG. 5 is a elevational front view showing an essential portion of the flange section in the inner tube of resin.
Figure 6:
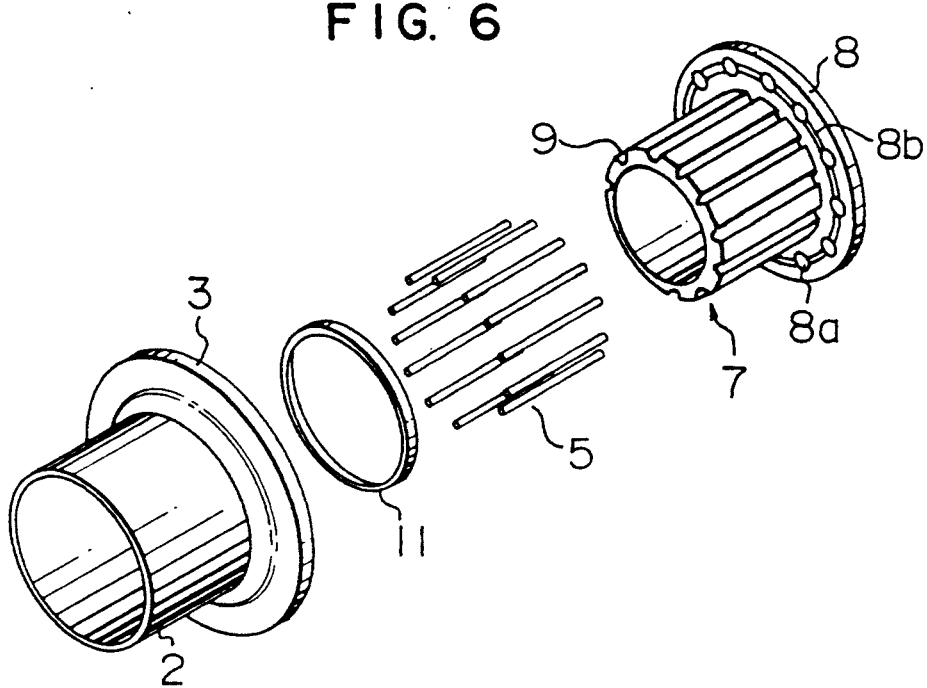
FIG. 6 is an exploded perspective view showing the bearing of the invention.

A bearing 1 (for example, inner diameter: 10 mm, outer diameter: 14 mm, outer diameter of flange: 22 mm, and axial length (usually referred to width): 12.5 mm) of the invention is shown in FIG. 1 as a cross-sectional view taken along an axis thereof. FIG. 2 is a cross-sectional view taken along line II—II in FIG. 1, and FIG. 3 is an enlarged view of an essential portion in FIG. 2.

The bearing 1 comprises an outer tube 2 made of austenitic stainless steel (for example, JIS SUS304, JIS SUS307), rollers 5 made of austenitic stainless steel wire (for example, JIS SUS304, JIS SUS307), a inner tube 7 made of resin, a collar 11 and thrust rollers 6 (for example, JIS SUS304, JIS SUS440C, JIS SUJ2, ceramics).

The cylindrical outer tube 2 having a flange 3 is made from an austenitic stainless steel sheet, and is formed by a transfer press. During a final stage of bearing assemblying, one end section of a cylindrical body is bent so that the cylindrical body is brought to a final configuration of the tube 2.

The inner tube 7 of resin is produced by injection molding. The outer peripheral surface of the tube 7 is provided with a plurality of (ten to twenty four, for example) roller receiving grooves 9 which extend in a direction along an axis of the bearing and which are parallel with one another. A plurality of (six to eighteen, for example) ball receiving recesses 8a are formed on one surface, which faces to the position side of the grooves 9, of a flange 8 of the tube 7. The recesses 8a are arranged intermittently along a phantom single circle coaxial with the tube body.

At the other end portion opposed to the flange 8, a collar (or annular ring) 11 serving as a roller stopper is fitted on the outer surface of the inner tube 7, and it is prevented to come out from the tube 7 by a stopper of a bent end portion of the outer tube 2. The radial rollers 5 are received respectively in the roller receiving grooves 9. Balls 6 as rolling elements are received respectively in the thrust ball receiving recesses 8a. The radial rollers 5 and the thrust balls 6 are rotatable under a contact relationship with the outer tube 2.

Grease is applied, if necessary, to the outer peripheral surface and a flange surface of the inner tube 7. The tube 7 is incorporated into the outer tube 2 together with the radial rollers 5 and the thrust balls 6.

In case where grease is applied, it is preferable that an upper half zone of each of the receiving grooves 9 is formed as inclined wall surfaces widen toward the ends so that room spaces 10 between the inclined wall surface, rollers 10 and the tube 2 are utilized as a grease reservoir. It is also preferable that grooves 8b, which are formed along a phantom single circle on the surface of the flange 8 as to connect the every recesses 8a, are utilized as a grease reservoir.

Thus, after all elements have been incorporated into the outer tube 2, a circumferential end portion of the flange 3 of the outer tube 2 is bent toward the axis. The bent end portion of the flange 3 and the collar 11 effectively prevents the grease to leak out to the outside of the bearing and also prevents foreign matters to enter into the interior of the bearing. The flange 3 is formed with a circumferential raceway groove 4 for guiding the thrust balls 6.

The inner tube 7 is preferably made from a fiber reinforced resin in which carbon fibers are added to resin by 5 to 50 wt %. For example, the fiber reinforced resin consists of 20 wt % of carbon fiber, 5 wt % of Teflon and the balance of PEEK.

Figure 7:
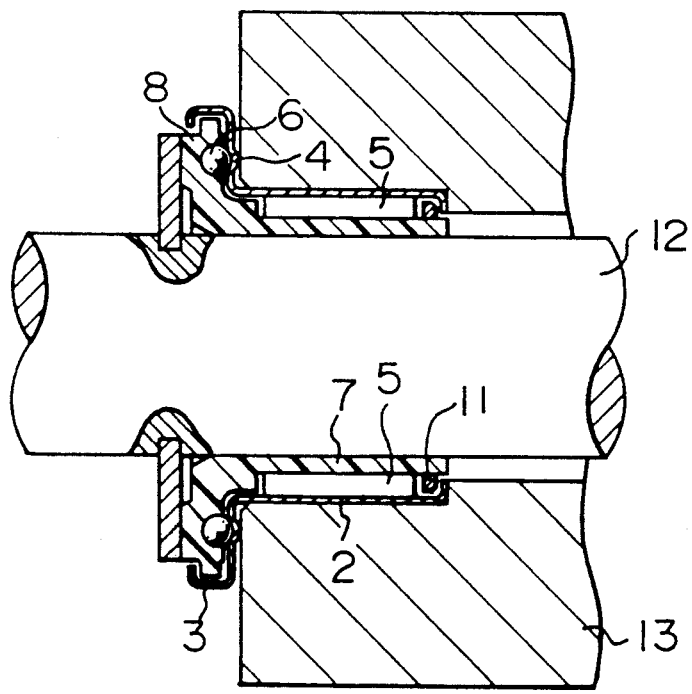
FIG. 7 is a longitudinal cross-sectional view showing the invention bearing assenbled to related parts.
Figure 8:
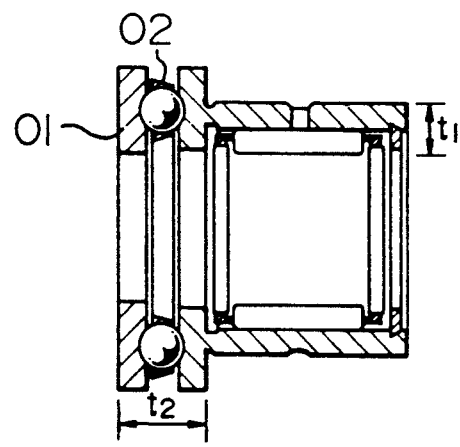
FIG. 8 is a longitudinal cross-sectional view showing a radial/thrust composite bearing having needle rollers and balls in prior art.
Figure 9:
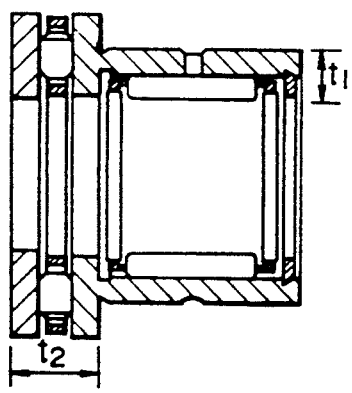
FIG. 9 is a longitudinal cross-sectional view showing a radial/thrust composite bearing cylindrical rollers inprior art.
Figure 10:
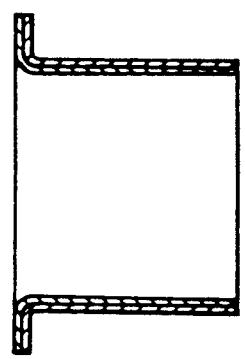
FIG. 10 is a longitudinal cross-sectional view showing a radial/thrust composite bearing slide bearing inprior art.

FIG. 7 shows an assembled manner of the bearing 1 and other parts, in which a shaft 12 extends through the inner tube 7 which is fitted into an end portion of a through hole in an element 13.

Thus, advantages of the above bearing are as follows.

In the conventional radial/thrust composite bearing with needle rollers, a retainer for retaining the rollers and the balls is used in addition to the inner race and the thrust plate. In the present bearing, however, the inner tube serving as an inner race has both functions of a thrust plate and a retainer. In this sense, the number of parts is reduced, and the bearing structure can be simplified.

As the inner tube 7 is made of resin, the inner tube has a vibration damper effect by which noise is prohibited to generate, and the invention bearing can be used as a bearing low in noise and vibration as compared with the conventional radial/thrust composite bearings having needles roller.

In the case where the outer tube 2 and the radial rollers 5 are of austenitic stainless steel, the thrust balls 6 are of martensitic stainless steel, and the collar 11 is of resin or austenitic stainless steel, there is no fear of corrosion as a whole of the bearing. The bearing is capable of being used under bad or severe conditions at high temperature and high humidity. Thus, the bearing is applicable in various utilizations.

As will be apparent from the above, according to the invention bearing, the following advantages are obtained:

1. For the conventional radial/thrust composite bearing having needle rollers, the retainer for retaining the rollers and the balls is used in addition to the inner race and the thrust plate. In contrast, according to the invention bearing, the inner tube as an inner race has both the functions of the thrust plate and the retainer. In this sense, the number of parts is reduced, and the bearing structure can be simplified.

2. The conventional radial/thrust composite bearing having needle rollers is unsuitable for being used at a narrow location. In contrast, according to the invention bearing, it is possible to reduce the thickness to a degree approximate to those of slide bearings. Accordingly, it is also possible to incorporate the bearing to a location which is very narrow. Thus, an attempt can be made to reduce the weight of an instrument which equips with the bearing. Reducible weight of the bearing is in an order of about 1/5 to 1/8 of the weight of conventional radial/thrust composite bearings. The invention bearing is less in noise and can effectively be applied to a portable instrument or the like.

3. Upon the use of the conventional radial/thrust composite bearing it is required to strictly specify a surface roughness and a hardness of a shaft to be born, and thus much work loads are required in machining and polishing of the shaft. In contrast, according to the invention bearing, such processing is not required with respect to a shaft to be supported by the bearing. Kind of material, surface roughness and the like of the shaft which is used in combination with the bearing invention are not so important, and an aluminum-alloy shaft, which is not expensive and which is light in weight, is also possible to use. As a result, the cost of parts around the bearing.

4. Upon the use of the conventional radial/thrust composite bearing of the slide bearing, it is required to specify the surface roughness and the hardness of the shaft, and the present shaft is required to have an end portion for acting the thrust load on the bearing. In the invention bearing, the such processing is not required with respect to the shaft, and the cost of manufacturing the shaft is reduced. Further, the coefficient of friction is low as compared with the conventional radial/thrust composite slide bearing so that a driving force can be reduced.

5. In the case where the outer tube and the radial rollers are of austenitic stainless steel, and the thrust balls are of martensitic stainless steel, it is possible to overcome corrosion problems of the bearing.

6. The invention bearing is of low coefficient of friction as compared with the conventional radial/thrust composite slide bearing, and is small in size as compared with the conventional radial/thrust composite needle roller bearing. Further, if consideration is made to the fact that there is less in noise by a vibration damping effect of the inner tube of resin, the present invention has advantages of both roller bearings and slide bearings.

What is claimed is:

1. A radial/thrust composite bearing having rolling elements, which comprises a metallic outer tube having a flange at one end thereof, an inner tube of resin having a flange at one end thereof, rollers of the rolling elements interposed between both said tubes, and a plurality of thrust balls of the rolling elements interposed between the flanges of the respective inner and outer tubes, wherein a plurality of radial roller receiving grooves extending along an axis of said bearing and extending in parallel relation to one another are formed in an outer peripheral surface of said inner tube, and a plurality of thrust-ball receiving recesses are formed intermittently and circumferentially on a surface of the flange of said inner tube, which faces to the position side of said radial-roller receiving grooves on the outer surface of the inner tube;

a circumferential raceway groove for guiding said thrust balls are formed in a surface of the flange of said outer tube, which opposes to the flange of said inner tube; and said two kinds of rolling elements roll between said inner and outer tubes.

2. The radial/thrust composite bearing according to claim 1, wherein said radial rollers are made from a steel wire or rod having good wear resistance.

* * * * *